(12) United States Patent
Chen et al.

(10) Patent No.: US 9,305,515 B2
(45) Date of Patent: Apr. 5, 2016

(54) CONTENT PLAYER WITH TRANSFERENCE READER

(71) Applicant: Disney Enterprises, Inc., Burbank, CA (US)

(72) Inventors: Alex Chen, La Canada Flintridge, CA (US); Evan Acosta, La Crescenta, CA (US); Edward Drake, Stevenson Ranch, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 103 days.

(21) Appl. No.: 13/944,842

(22) Filed: Jul. 17, 2013

(65) Prior Publication Data

US 2014/0233910 A1    Aug. 21, 2014

Related U.S. Application Data

(60) Provisional application No. 61/766,065, filed on Feb. 18, 2013.

(51) Int. Cl.
*H04N 5/92* (2006.01)
*G09G 5/00* (2006.01)
*G06T 13/80* (2011.01)
(Continued)

(52) U.S. Cl.
CPC .............. *G09G 5/003* (2013.01); *G06F 3/1423* (2013.01); *G06F 3/1438* (2013.01); *G06Q 20/3226* (2013.01); *G06Q 20/3829* (2013.01); *G06Q 20/401* (2013.01); *G06Q 30/0261* (2013.01); *G06Q 30/0267* (2013.01); *G06Q 30/0623* (2013.01); *G06Q 30/0625* (2013.01); *G06T 13/80* (2013.01); *H04B 5/02* (2013.01); *G06F 3/0346* (2013.01); *G09G 2370/04* (2013.01);
(Continued)

(58) Field of Classification Search
CPC .......... G09G 2370/04; G09G 2370/10; G09G 2370/16; G09G 5/003; G06T 13/80; G06Q 30/0261; G06Q 30/0267; G06Q 30/0623; G06Q 30/0625; G06Q 20/3226; G06Q 20/3829; G06Q 20/401; G06F 3/1423; G06F 3/1438; H04B 5/02; H04N 5/92; H04N 5/93
USPC ........................................................ 386/248
See application file for complete search history.

(56) References Cited

U.S. PATENT DOCUMENTS 5,986,675 A * 11/1999 Anderson et al. ............. 345/473
6,222,807 B1 * 4/2001 Min-Jae ................. G06Q 20/12
                                                        369/47.12

(Continued)

FOREIGN PATENT DOCUMENTS

CN     101312514     11/2008
WO     02071285     9/2002

OTHER PUBLICATIONS http://www.youtube.com/watch?v=f43NGb8XRK4, Feb. 19, 2012.

*Primary Examiner* — William Tran
(74) *Attorney, Agent, or Firm* — Patent Ingenuity, P.C.; Samuel K. Simpson (57) ABSTRACT

A first proximity-based device at a content player receives content modification data from a second proximity-based device within a product and/or a product package when the product or product package is placed within a proximity to the first proximity-based device. A processor at the content player performs modified playback of media content based on the content modification data.

20 Claims, 5 Drawing Sheets

(51) Int. Cl.
  *H04B 5/02*    (2006.01)
  *G06Q 30/02*   (2012.01)
  *G06Q 30/06*   (2012.01)
  *G06Q 20/32*   (2012.01)
  *G06Q 20/38*   (2012.01)
  *G06Q 20/40*   (2012.01)
  *G06F 3/14*    (2006.01)
  *G06F 3/0346*  (2013.01)

(52) U.S. Cl.
  CPC ........ *G09G 2370/10* (2013.01); *G09G 2370/16* (2013.01)

(56) References Cited

U.S. PATENT DOCUMENTS

| | | |
|---|---|---|
| 7,663,488 B2 | 2/2010 | Kalama et al. |
| 8,010,621 B2 | 8/2011 | Zilliacus et al. |
| 2005/0111825 A1* | 5/2005 | Yun ................................. 386/52 |
| 2007/0037614 A1 | 2/2007 | Rosenberg |
| 2007/0254674 A1 | 11/2007 | Pedigo |
| 2008/0109309 A1 | 5/2008 | Landau et al. |
| 2008/0134032 A1 | 6/2008 | Pirnack |
| 2009/0085724 A1 | 4/2009 | Naressi et al. |
| 2009/0157449 A1 | 6/2009 | Itani |
| 2010/0004988 A1 | 1/2010 | Matsuo |
| 2010/0010964 A1 | 1/2010 | Skowronek et al. |
| 2010/0114983 A1 | 5/2010 | Robert et al. |
| 2010/0136898 A1 | 6/2010 | Farrow |
| 2010/0161434 A1* | 6/2010 | Herwig ................ G06Q 20/201 705/20 |
| 2010/0174599 A1* | 7/2010 | Rosenblatt et al. ........ 705/14.37 |
| 2010/0300913 A1 | 12/2010 | Goldburt |
| 2011/0016023 A1 | 1/2011 | Zakas |
| 2011/0112917 A1 | 5/2011 | Driessen |
| 2011/0140993 A1 | 6/2011 | Bess |
| 2011/0288938 A1 | 11/2011 | Cook |
| 2011/0299830 A1* | 12/2011 | Sasaki ................... G11B 27/002 386/241 |
| 2011/0320278 A1 | 12/2011 | Littman |
| 2012/0062475 A1 | 3/2012 | Locker |
| 2012/0077584 A1 | 3/2012 | Sarmenta |
| 2012/0101885 A1 | 4/2012 | Lee |
| 2012/0155380 A1 | 6/2012 | Hodges |
| 2012/0208592 A1 | 8/2012 | Davis et al. |
| 2012/0218089 A1 | 8/2012 | Hill |
| 2012/0220220 A1 | 8/2012 | DeLuca et al. |
| 2012/0220221 A1 | 8/2012 | Moosavi et al. |
| 2012/0224743 A1 | 9/2012 | Rodriguez et al. |
| 2012/0226573 A1 | 9/2012 | Zakas |
| 2012/0245988 A1 | 9/2012 | Pace et al. |
| 2012/0271712 A1 | 10/2012 | Katzin et al. |
| 2012/0271717 A1 | 10/2012 | Postrel |
| 2012/0290377 A1 | 11/2012 | Itani |
| 2013/0002405 A1 | 1/2013 | Pesonen et al. |
| 2013/0006869 A1 | 1/2013 | Grab et al. |
| 2013/0106684 A1 | 5/2013 | Weast et al. |
| 2013/0181886 A1 | 7/2013 | Hill |
| 2013/0185137 A1* | 7/2013 | Shafi ................... G06Q 30/0207 705/14.35 |
| 2013/0237147 A1 | 9/2013 | Dearman |
| 2013/0300637 A1* | 11/2013 | Smits et al. ...................... 345/8 |
| 2014/0131452 A1* | 5/2014 | Testanero ........... G06K 19/0723 235/492 |

* cited by examiner

CONTENT PLAYER WITH TRANSFERENCE READER

RELATED APPLICATIONS

This application claims priority to U.S. Provisional Patent Application Ser. No. 61/766,065, filed on Feb. 18, 2013, entitled TRANSFERENCE OF DATA TO PROVIDE CONTENT, which is hereby incorporated by reference in its entirety.

BACKGROUND

1. Field

This disclosure generally relates to the field of data transference.

2. General Background

Media content users are currently provided with a wide variety of devices and modes of communication for watching and/or listening to media content that they purchased. Examples of such media products are Blu-ray discs or DVDs with movies, television shows, video games, or the like. For instance, media content users may currently watch and/or listen to media content from devices such as Blu-ray players, DVD players, Digital Video Recorders ("DVRs"), game consoles, tablet devices, smartphones, and/or the like. Further, a wide variety of input mechanisms may be utilized for providing the media content to those devices. For example, the media content may be stored on a Blu-ray disc, a DVD, a storage device within a DVR, streamed to a mobile device, or the like.

Although media content users are provided with a wide variety of devices for content playback and modes of input for providing the media content to those playback devices, media content users are often limited in their ability to change the content that is being played. As an example, a user may play a video game that typically remains unchanged. The theme and characters are predetermined and are typically unmodified after the purchase of the video game by the media content user. The video game characters have the same appearance, abilities, features, and the like. The media content user often has to wait until a new version of the video game is developed to benefit from additional features for that particular video game. As a result, media content users are offered very little variety for the media content they purchase. That lack of variety may lead to boredom with respect to the purchased media content and a lack of interest for future purchases of similar types of media content.

SUMMARY

An apparatus comprises a reader that receives content modification data from a proximity-based device in a product or a product package when the product or product package is placed within a proximity to the reader. Further, the apparatus comprises a processor that modifies playback of an original media content based on the content modification data.

Further, a process receives, with a first proximity-based device at a content player, content modification data from a second proximity-based device within a product or product package based upon the product or product package is placed within a proximity to the first proximity-based device. In addition, the process performs, with a processor at the content player, modified playback of media content based on the content modification data.

In addition, a computer program product comprises a computer readable storage device. The computer readable storage device comprises a computer readable program stored thereon. The computer readable program when executed on a computer causes the computer to receive, with a content player proximity-based device at a content player, content modification data from a proximity-based device within a product and/or a product package when the product and/or product package is placed within a proximity to the content player proximity-based device. Further, the computer readable program when executed on the computer causes the computer to perform, with a processor at the content player, modified playback of media content based on the content modification data.

BRIEF DESCRIPTION OF THE DRAWINGS

The above-mentioned features of the present disclosure will become more apparent with reference to the following description and accompanying drawings, wherein like reference numerals denote like elements and in which.

DETAILED DESCRIPTION

A data transference configuration provides users with the ability to customize playback of media content. A user may purchase a media product, e.g., a Blu-ray disc, DVD, streamed or downloaded digital movie, video game, or the like. Alternatively, the product may be an entertainment product that is not a media product, e.g., an action figure, a doll, or the like. A content player, e.g., Blu-ray disc player, DVD player, DVR, game console, or the like utilized by the user detects the presence of the product and/or a product package containing the product. Based upon such detection, the content player is able to modify a first set of media content with features from a second set of media content.

As an example, a user may purchase a CD-ROM that stores a particular video game. The user may then insert the CD-ROM into the game console for play of the video game. The characters in that video game may be limited to particular appearances, abilities, powers, accessories, or the like. The user may then subsequently place another product and/or package of another product (such as a movie or an additional video game, e.g., with different characters having different abilities) within proximity to the game console during playback of the initial video game. Based upon the detection of the additional video game or package, the game console provides the user with the ability to modify the initial video game to enhance the initial video game with features from the additional video game. For example, the user may be able to enhance the abilities or appearance of a particular character in the initial video game with abilities or appearance of a character in the additional video game. In one embodiment, the user is able to select the additional video game so that the user is provided with the ability to modify the initial video game according to his or her own preferences. The user can vary the additional video game so that the user can regularly change the types of enhancements that are provided to the initial video game. As a result, the user is provided with a more interesting and dynamic approach to the viewing and/or listening of media content.

Figure 1:
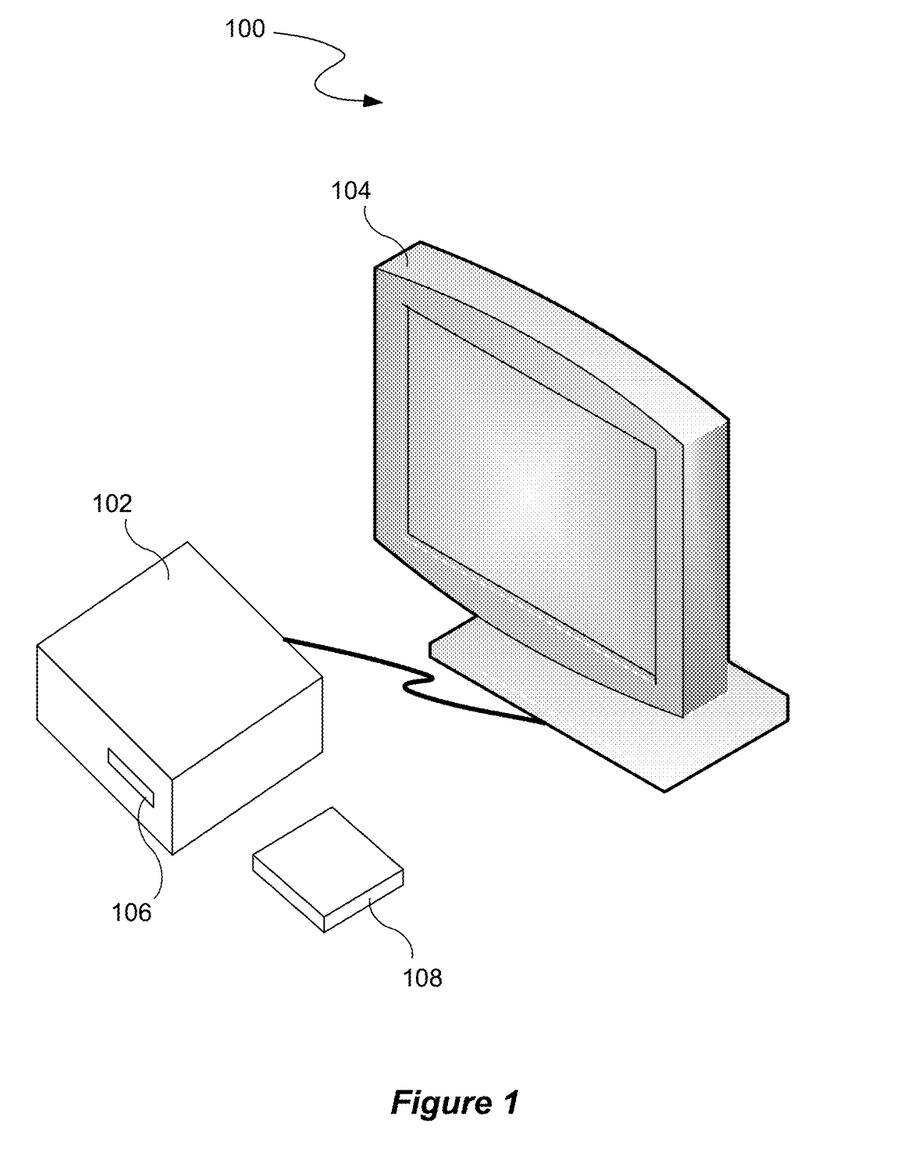
FIG. 1 illustrates a data transference configuration that allows for proximity-based detection and modification of media content data.

FIG. 1 illustrates a data transference configuration 100 that allows for proximity-based detection and modification of media content data. A content player 102 is in operable communication, e.g., wireline or wireless, with a display device 104. The content player 102 may be a media playback device such as a Blu-ray disc player, DVD player, DVR, mobile device, smartphone, tablet device, computing device, game console, wearable computing devices, e.g., glasses, watch, or the like, personal computer ("PC"), laptop, or the like. The display device 104 may be a television, computer monitor, or the like. In one aspect, the display device 104 is not integrated within the content player 102. In an alternative aspect, the display device 104 is integrated within the content player 102.

The content player 102 may receive an initial set of media content from one or more possible input modes. As an example, a storage device input 106 may receive a storage device such as a Blu-ray disc, DVD, CD-ROM, USB drive, or the like. Alternatively, the content player 102 may receive media content through a network, e.g., media content that is streamed or downloaded from a server through the Internet. As yet another alternative, the content player 102 may internally store the initial set of media content. For example, the content player 102 may be a DVR player that has a storage device that records media content that is broadcast or sent to the content player 102 through a cable or network connection.

A product and/or a product package 108 may be positioned by a user within a proximity to the content player 102. The product and/or the product package 108 stores an additional set of media content. The proximity may be predefined so that the user has to place the product and/or the product package 108 within a substantially close proximity to the content player 102 for the content player 102 to detect the presence of the product and/or the product package 108. For example, the user may place the product and/or the product package 108 close to the side of the content player 102 or on top of the content player 102.

After detecting the presence of the product and/or the product package 108, the content player 102 may then be utilized to modify the initial set of content based upon the additional set of content. Accordingly, the user may modify the initial content to provide enhancements such as modifying a character's appearance, abilities, accessories, or modifying the characters themselves. For instance, the user may modify a character's ability in the initial media content to import a jumping ability from a character in the additional media content. As another example, a user may import an accessory such as armor or a costume from a character in the additional media content so that a character in the initial media content may utilize that armor or costume during scenes of the video game or movie. As yet another example, the user may import a character from the additional media content. For example, a user may want to have a particular character with certain abilities available for game play in the initial media content. The abilities, accessories, and characters are just examples of the type of data that may be imported from the additional media content. Various other types of data may be imported to allow the user to customize the experience of the initial media content based upon the additional media content.

Figure 2:
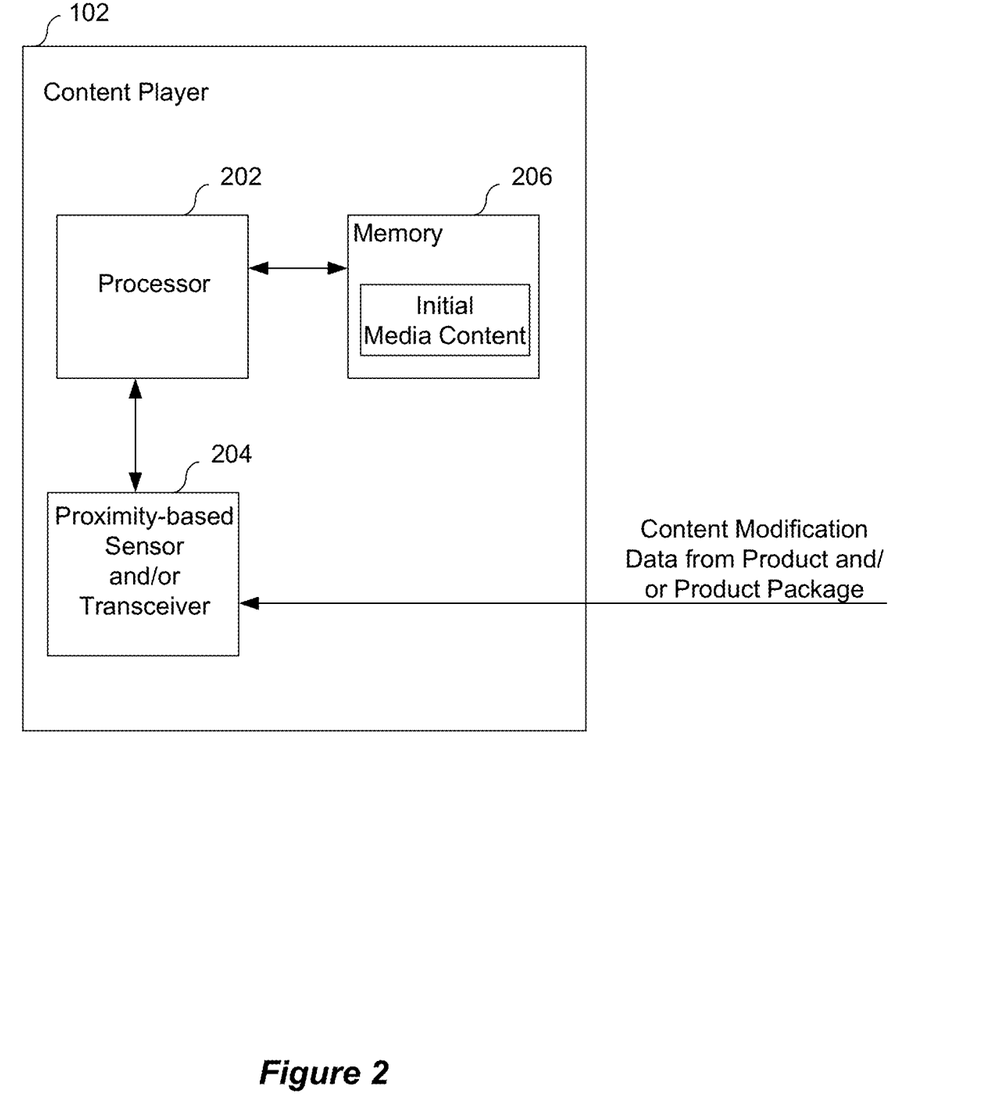
FIG. 2 illustrates internal components of the content player illustrated in FIG. 1.

FIG. 2 illustrates internal components of the content player 102 illustrated in FIG. 1. The content player 102 has a processor 202, a proximity-based sensor and/or transceiver 204, and a memory 206. The content player 102 receives content modification data from the product and/or the product package 108 illustrated in FIG. 1. The proximity-based sensor and/or transceiver 204 may be a RFID chip or tag reader, Near Field Communication ("NFC") chip or tag reader, Bluetooth transceiver, or the like. The proximity-based sensor and/or transceiver 204 may establish radio or other communication with a communication device present in the product and/or the product package 108 based upon one or more standards, e.g., NFC standards. In one aspect, the proximity-based sensor and/or transceiver 204 is a reader that detects presence of the product and/or the product package 108 within proximity to the content player 102.

The processor 202 modifies the initial media content stored in and/or retrieved from the memory 206 according to the content modification data received from the product and/or the product package 108 illustrated in FIG. 1. The initial media content 206 may be stored in the memory 206 after being streamed to the content player 102, retrieved from a data storage device such as a hard drive, or retrieved from a computer readable storage device, such as a DVD, Blu-Ray disc, or the like.

Figure 3:
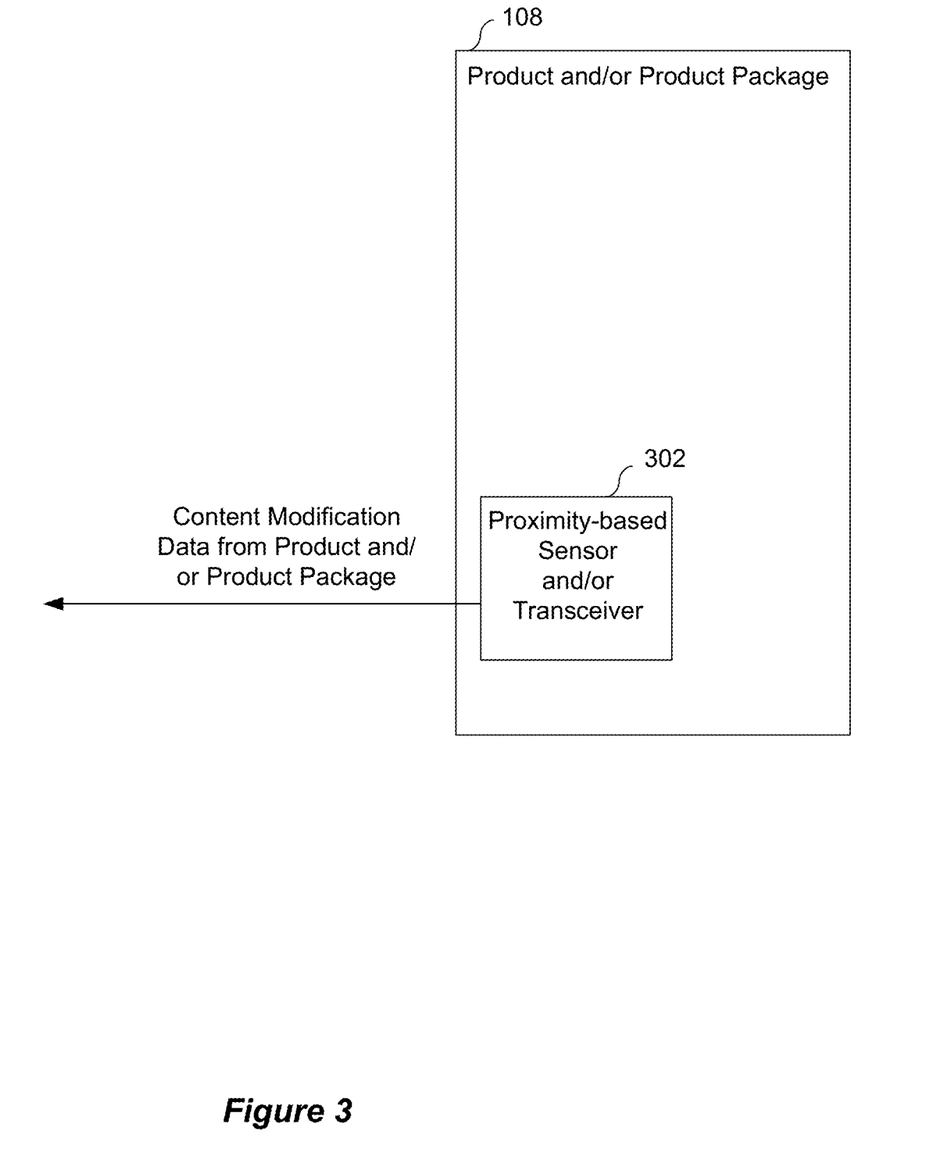
FIG. 3 illustrates internal components of the product and/or the product package illustrated in FIG. 1.

FIG. 3 illustrates internal components of the product and/or the product package 108 illustrated in FIG. 1. The product and/or the product package 108 comprises a proximity-based device 302. The proximity-based device 302 may send the content modification data to the proximity-based sensor and/or transceiver 204 of the content player 102 illustrated in FIG. 2.

In one aspect, the proximity-based device 302 is a passive device that does not require power and does not transmit any signal by itself. When a user moves the proximity-based device 302 within a range of the proximity-based sensor and/or transceiver 204 of the content player 102, the proximity-based sensor and/or transceiver 204 reads content modification data from the proximity-based device 302.

In an alternative aspect, the proximity-based device 302 is an emitter that constantly or periodically emits a signal from the product and/or the product package 108. The proximity-based sensor and/or transceiver 204 of the content player 102 illustrated in FIG. 2 can detect the presence of the proximity-based device 302. The proximity-based sensor and/or transceiver 204 can then receive the content modification data from the proximity-based device 302.

In an alternative aspect, the proximity-based device 302 detects the presence of the proximity-based sensor and/or transceiver 204 of the content player 102 illustrated in FIG. 2. The proximity-based device 302 then sends the content modification data based upon such detection rather than constantly emitting the content modification data. The product and/or the product package 108 is not limited to utilizing the proximity-based device 302 to send the modification data. As an alternative, the product and/or the product package 108 may send a token. For example, the product and/or the product package 108 may constantly emit a token. Based upon receipt of the token within a particular proximity, the proximity-based sensor and/or transceiver 204 of the content player 102 may then establish communication with a device, e.g., the proximity-based device 302, in the product and/or the product package 108 to receive the modification data.

Figure 4:
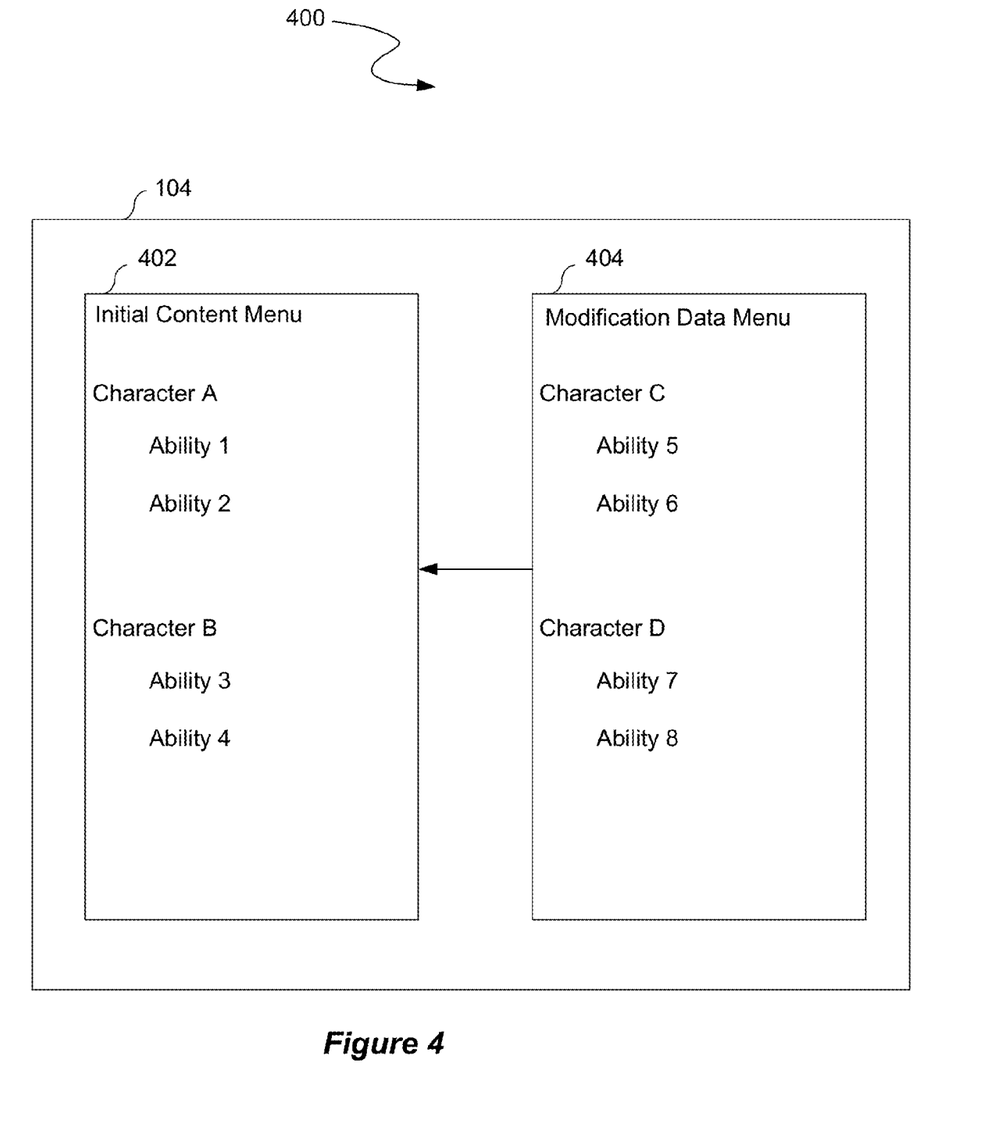
FIG. 4 illustrates an example of interactive menus displayed by the display device illustrated in FIG. 1.

FIG. 4 illustrates an example of interactive menus displayed by the display device 104 illustrated in FIG. 1. The display device 104 may display an initial content menu 402 and a modification data menu 404. For example, the initial content menu 402 may display the names of various characters in the initial content, e.g., Character A and Character B, in addition to various features, e.g., Ability 1 for Character A, Ability 2 for Character A, Ability 3 for character C, and Ability 4 for Character D. As another example, the modification data menu 404 may display the names of various characters in the additional content, e.g., Character C and Character D, in addition to various features, e.g., Ability 5 for Character C, Ability 6 for Character C, Ability 7 for Character D, and Ability 8 for Character D. The user may then interact with the menus to add features from the modification data of the additional content to the initial content. Various modes of interaction may be utilized, e.g., drag and drop, manual text input, or the like. For example, the user may drag and drop Ability 5 from Character C in the additional content to Character B in the initial content. As a result, Character B may then have that additional ability the next time that the user watches and/or listens to the initial content that has been modified.

Although gaming examples have been utilized herein, the content modification configurations provided for herein may be utilized for a variety of types of content. For example, the content modification configurations may be utilized for characters and/or scenes in a movie. The user may be able to modify a movie by importing costumes, characters, scenes and/or features from the additional content to characters and/or scenes in the initial content.

For example, a super hero (e.g., Spider-Man) may have a first costume (e.g., red and blue) in a first movie and a second costume (e.g., black and white) in a second movie. When the Blu-ray disc package of the second movie is placed on top of a Blu-ray player playing the first movie, the player modifies playback of the first movie so that the hero appears to be wearing the second costume in the second movie.

As another example, a super hero may not have an aura or glow when he/she uses a power in first movie, but he/she does have an aura or glow when he/she uses a power in a second movie. When the Blu-ray disc package of the second movie is placed on top of a Blu-ray player playing the first movie, the player modifies playback of the first movie so that the hero has an aura or glow when he/she uses a power.

As another example, when a Blu-ray disc package of a second movie is placed on top of a Blu-ray player playing a first movie, the player adds one or more scenes from the second movie to playback of the first movie. In one embodiment, selection of the added scenes is done automatically (as selected by the movie studio). In another embodiment, the content player 102 provides a menu on display 104 to let a user select the added scenes.

As another example, audio files (such as languages) may be modified. A first movie may be in English. A second movie may be in Chinese. When the Blu-ray disc package of the second movie is placed on top of a Blu-ray player playing the first movie, the player modifies playback of the first movie so that it is played with a Chinese audio track.

In addition, two or more products or product packages 108 may be placed near the content player 102, which reads content modification data from both products or product packages 108. For example, a user places a "Captain America" Blu-ray disc package and an "Iron Man" Blu-ray disc package on top of a Blu-ray player playing an "Avengers" Blu-ray disc. This may cause the Blu-ray player to modify the appearance of a character and/or a scene in the "Avengers" movie.

Figure 5:
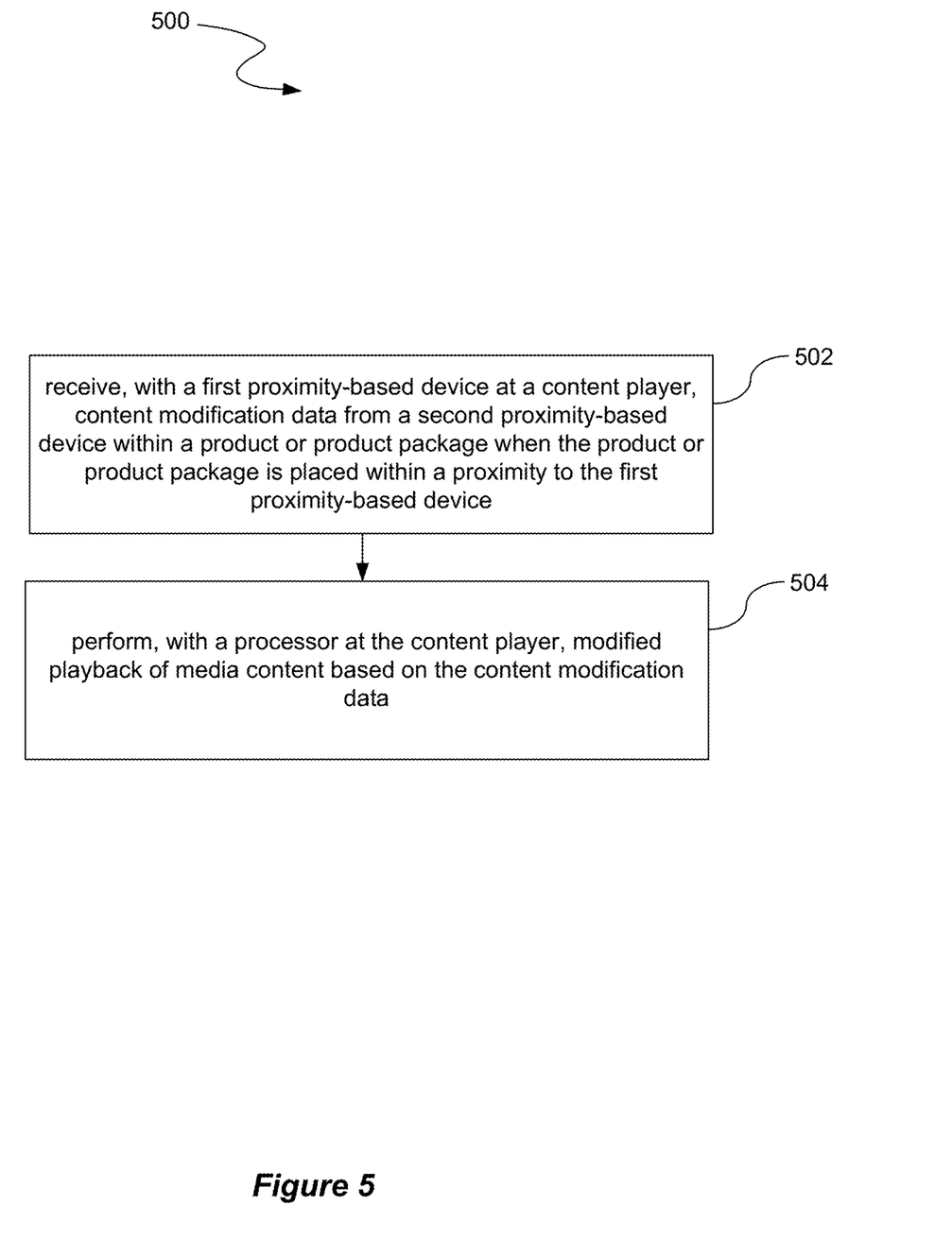
FIG. 5 illustrates a process that may be utilized to provide content modification based upon proximity detection.

FIG. 5 illustrates a process 500 that may be utilized to provide content modification based upon proximity detection. At a process block 502, the process 500 receives, with a first proximity-based device at a content player, content modification data from a second proximity-based device within a product or product package when the product or product package is placed within a proximity to the first proximity-based device. In addition, at a process block 504, the process 500 performs, with a processor at the content player, modified playback of media content based on the content modification data.

In one aspect, particular modification data may be stored in products and/or packages 108 based upon particular retail stores. For example, store A may sell a product and/or product package 108 with modification data having a particular ability, whereas store B may sell a product and/or product package 108 with modification data having a different ability for the same additional content.

In another aspect, particular modification data is available based upon geographic location. For example, geographic location A may allow a product and/or product package 108 to have modification data with a particular ability, whereas geographic location B may allow a product and/or product package 108 with modification data having a different ability for the same additional content.

In yet another aspect, a time restriction is imposed upon a particular feature of the modification data. For example, a particular feature such as an ability or costume may be stored on the product and/or the product package 108. That particular feature may only be available for a limited time to encourage purchasers to purchase the additional content for that modification data feature prior to a certain time. As another example, the particular feature may only be available during a pre-sale.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. An apparatus comprising:
a reader that automatically receives content modification data from a proximity-based device in a product or a product package when the product or product package is placed within a proximity to the reader;
a memory that stores at least a portion of an original media content; and
a processor that automatically modifies, after receiving a menu selection from a user that selects from the content modification data, said at least said portion of the original media content based on the selected content modification data without an additional user input, stores said at least said portion of the modified original media content in the memory, and performs playback of said at least said portion of the modified original media content by at least one of: adding bonus content into the playback of said at least said portion of the original media content, modifying an appearance of an object in the playback of said at least said portion of the original media content, and adding a new object into said at least said portion of the original media content that appears in the playback of the original media content.

2. The apparatus of claim 1, wherein the processor enhances a first feature of the original media content with a second feature present in the content modification data, the original media content lacking the second feature without the content modification data.

3. The apparatus of claim 2, wherein the first feature is a first costume and the second feature is a second costume that is distinct from the first costume.

4. The apparatus of claim 2, wherein the second feature is an aura display displayed around a character when the character utilizes a power.

5. The apparatus of claim 2, wherein the first feature is a first scene and the second feature is a second scene such that the processor performs a combined playback of the first scene and the second scene.

6. The apparatus of claim 5, wherein selection of the second scene is predetermined.

7. The apparatus of claim 5, wherein selection of the second scene is received from a menu.

8. The apparatus of claim 2, wherein the first feature is a first language and the second feature is a second language such that the processor modifies the playback according to the second language.

9. The apparatus of claim 2, wherein the apparatus receives additional content modification data from an additional product or product package when the additional product or product package is placed within the proximity to the reader such that the processor modifies playback of the original media content based on the content modification data and the additional content modification data.

10. The apparatus of claim 2, wherein the processor allows a user to select a feature to modify from the group comprising a character ability, appearance, accessory, and a cast of characters.

11. The apparatus of claim 1, further comprising an input device that receives the original media content.

12. The apparatus of claim 11, wherein the input device reads the original media content from a computer readable storage device.

13. The apparatus of claim 11, wherein the input device receives the original media content from a communication network.

14. The apparatus of claim 1, further comprising a data storage device that stores the original media content.

15. The apparatus of claim 1, wherein the reader is a Near Field Communication receiver.

16. The apparatus of claim 1, wherein the proximity-based device within the product or product package is a Near Field Communication chip.

17. The apparatus of claim 1, wherein the original media content is a movie.

18. The apparatus of claim 1, wherein the original media content is a video game.

19. A method comprising:
automatically receiving, with a first proximity-based device at a content player, content modification data from a second proximity-based device within a product or product package when the product or product package is placed within a proximity to the first proximity-based device;
automatically modifying after receiving a menu selection from a user that selects from the content modification data, based on the selected content modification data with a processor at the content player and without an additional user input, at least a portion of the original media content stored in a memory at the content player;
storing said at least said portion of the modified original media content in the memory; and
performing, with the processor at the content player, playback of said at least said portion of the modified original media content by at least one of: adding bonus content into the playback of said at least said portion of the original media content, modifying an appearance of an object in the playback of said at least said portion of the original media content, and adding a new object into said at least said portion of the original media content that appears in the playback of said at least said portion of the original media content.

20. A computer program product comprising a non-transitory computer readable storage device having a computer readable program stored thereon, wherein the computer readable program when executed on a computer causes the computer to:
automatically receive, with a content player proximity-based device at a content player, content modification data from a proximity-based device within a product and/or a product package when the product and/or product package is placed within a proximity to the content player proximity-based device;
automatically modify after receiving a menu selection from a user that selects from the content modification data, based on the selected content modification data with a processor at the content player and without an additional user input, at least a portion of an original media content stored in a memory at the content player;
store said at least said portion of the modified original media content in the memory; and
perform, with the processor at the content player, playback of said at least said portion of the modified original media content, the modification being performed based on the content modification data by at least one of: adding bonus content into the playback of said at least said portion of the original media content, modifying an appearance of an object in the playback of said at least said portion of the original media content, and adding a new object into said at least said portion of the original media content that appears in the playback of said at least said portion of the original media content.

* * * * *